United States Patent
Rosalsky et al.

(10) Patent No.: US 8,938,901 B2
(45) Date of Patent: Jan. 27, 2015

(54) IMAGE TO PAINTING

(71) Applicant: Saprise Limited, Hawley, PA (US)

(72) Inventors: Jeffrey Hal Rosalsky, Dingmans Ferry, PA (US); Lawrence Alf Martone, Hawley, PA (US)

(73) Assignee: Saprise Limited, Hawley, PA (US)

( * ) Notice: Subject to any disclaimer, the term of this patent is extended or adjusted under 35 U.S.C. 154(b) by 0 days.

(21) Appl. No.: 13/963,864

(22) Filed: Aug. 9, 2013

(65) Prior Publication Data

US 2014/0041270 A1    Feb. 13, 2014

Related U.S. Application Data

(60) Provisional application No. 61/742,471, filed on Aug. 13, 2012.

(51) Int. Cl.
| | |
|---|---|
| G09F 19/00 | (2006.01) |
| B44D 5/00 | (2006.01) |
| C09J 7/02 | (2006.01) |
| B32B 33/00 | (2006.01) |
| A47G 1/06 | (2006.01) |
| B32B 38/06 | (2006.01) |
| B44C 1/10 | (2006.01) |
| B44F 11/02 | (2006.01) |
| B32B 38/00 | (2006.01) |
| B32B 37/12 | (2006.01) |
| B32B 37/24 | (2006.01) |

(52) U.S. Cl.
CPC .............. B44D 5/00 (2013.01); C09J 7/0264 (2013.01); C09J 7/0278 (2013.01); B32B 33/00 (2013.01); A47G 1/06 (2013.01); C09J 7/0296 (2013.01); B32B 38/06 (2013.01); B44C 1/105 (2013.01); B44F 11/02 (2013.01); C09J 2201/162 (2013.01); C09J 2433/006 (2013.01); C09J 2467/006 (2013.01); C09J 2469/006 (2013.01); C09J 2483/006 (2013.01); B32B 38/0012 (2013.01); B32B 2037/1223 (2013.01); B32B 2037/243 (2013.01); B32B 2309/04 (2013.01); B32B 2309/10 (2013.01); B32B 2451/00 (2013.01)
USPC .......................................... 40/615

(58) Field of Classification Search
CPC ........................................ G09F 7/00
USPC .......................................... 40/615
See application file for complete search history.

(56) References Cited

U.S. PATENT DOCUMENTS

| | | | | |
|---|---|---|---|---|
| 3,804,700 | A * | 4/1974 | Hoey | 428/196 |
| 3,891,487 | A * | 6/1975 | Hoey | 156/78 |
| 5,721,041 | A * | 2/1998 | Baratto | 428/195.1 |
| 2002/0119287 | A1* | 8/2002 | Redlin | 428/141 |
| 2009/0277580 | A1* | 11/2009 | Singer | 156/325 |
| 2012/0118471 | A1* | 5/2012 | Singer | 156/60 |

* cited by examiner

Primary Examiner — Gary Hoge
(74) Attorney, Agent, or Firm — Resek, Liang & Frank LLP

(57) ABSTRACT

The present invention provides for a textured overlay, which allows an image to appear as an oil painting. The overlay includes, a transparent film having a non-adhesive surface, and an adhesive surface, and a texturized translucent polymer composition, wherein, the non-adhesive surface of the film contacts the polymer composition.

9 Claims, 5 Drawing Sheets

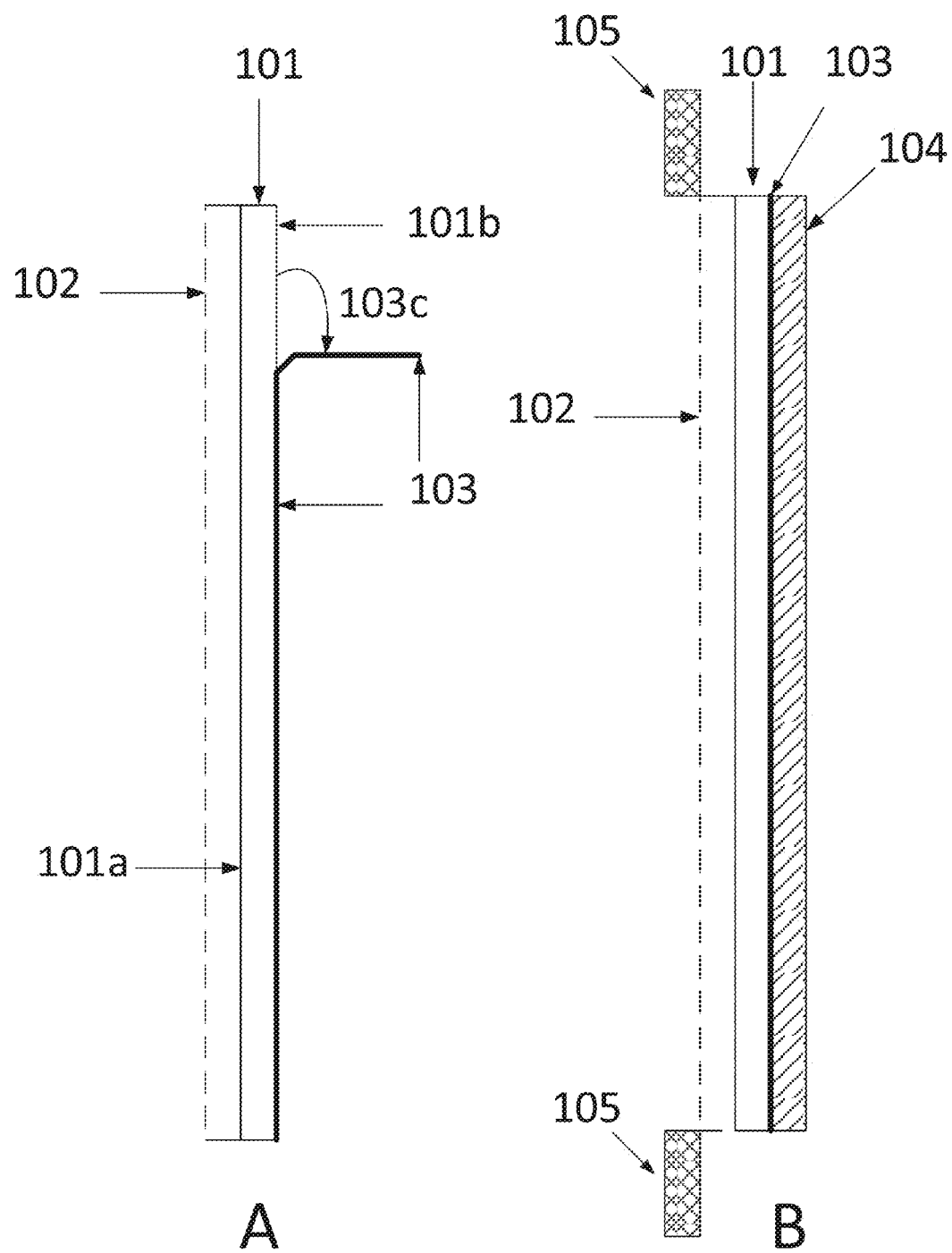

Figure 2-A
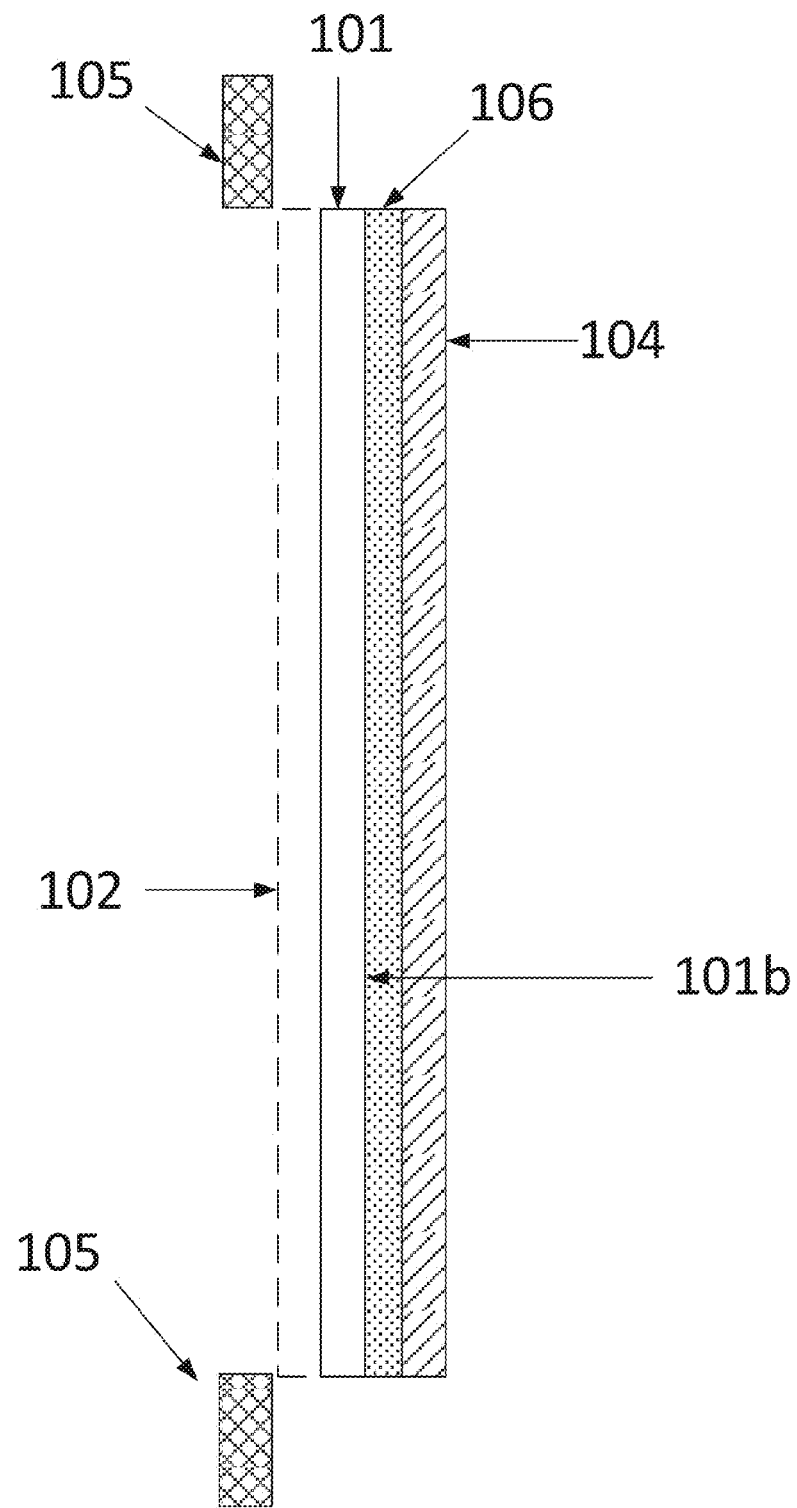

Figure 2-B
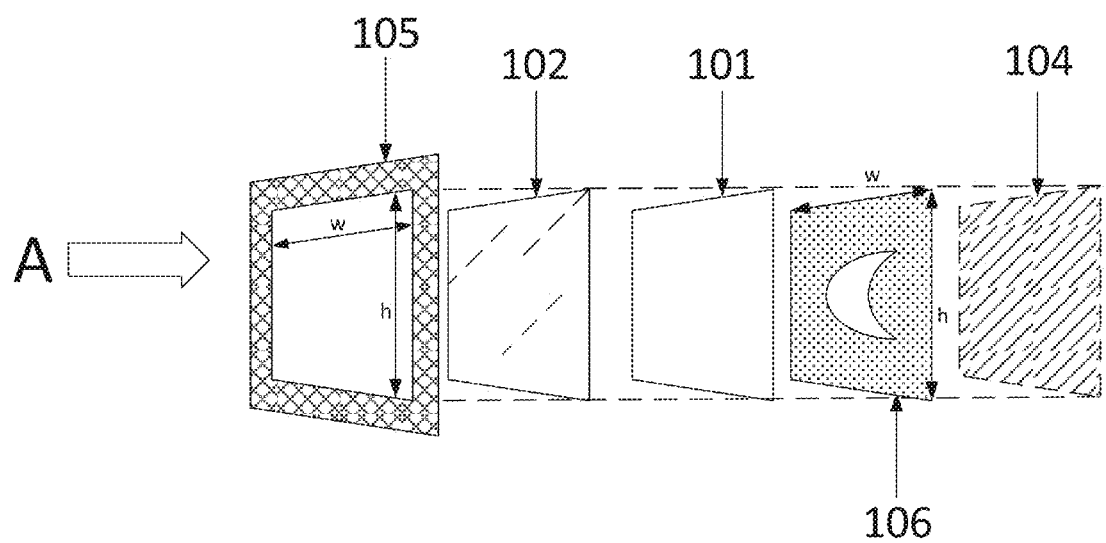

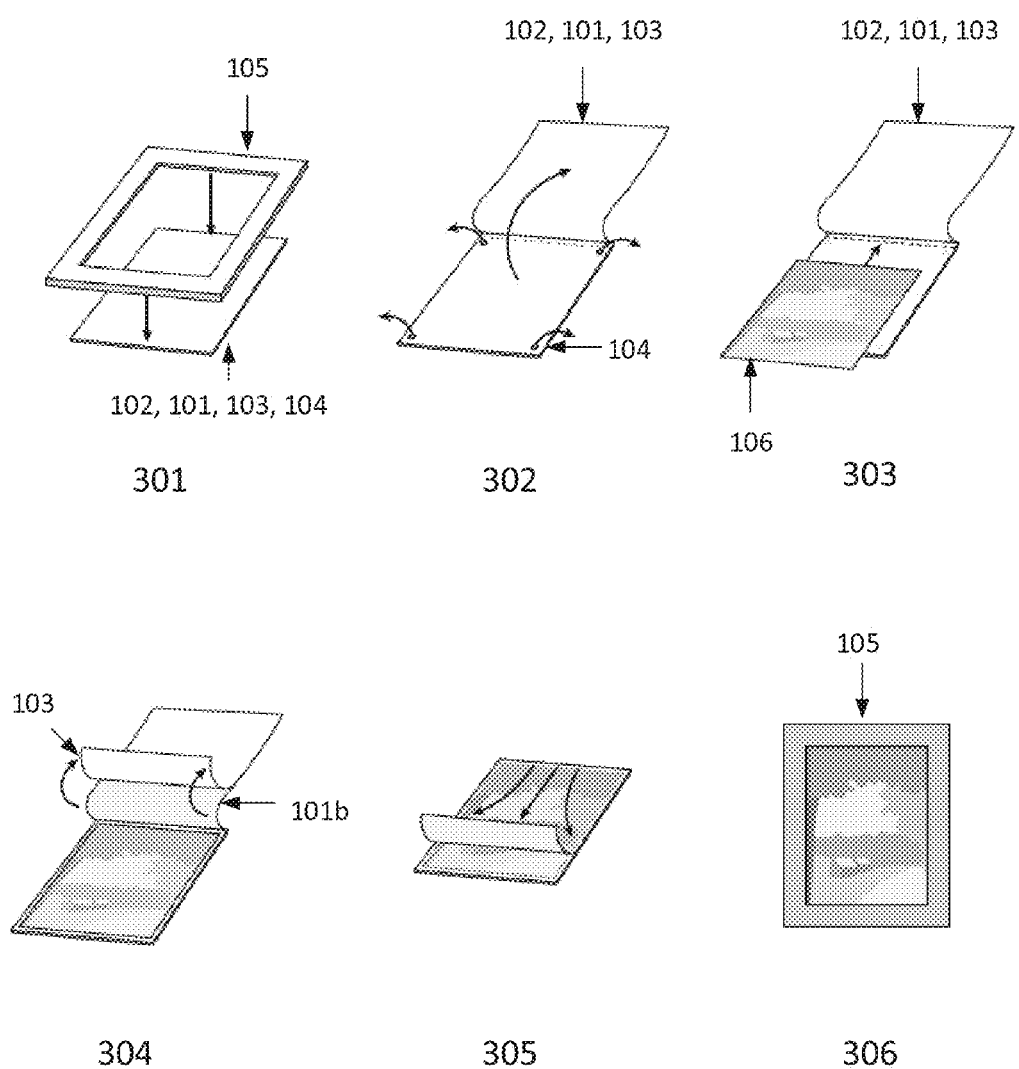

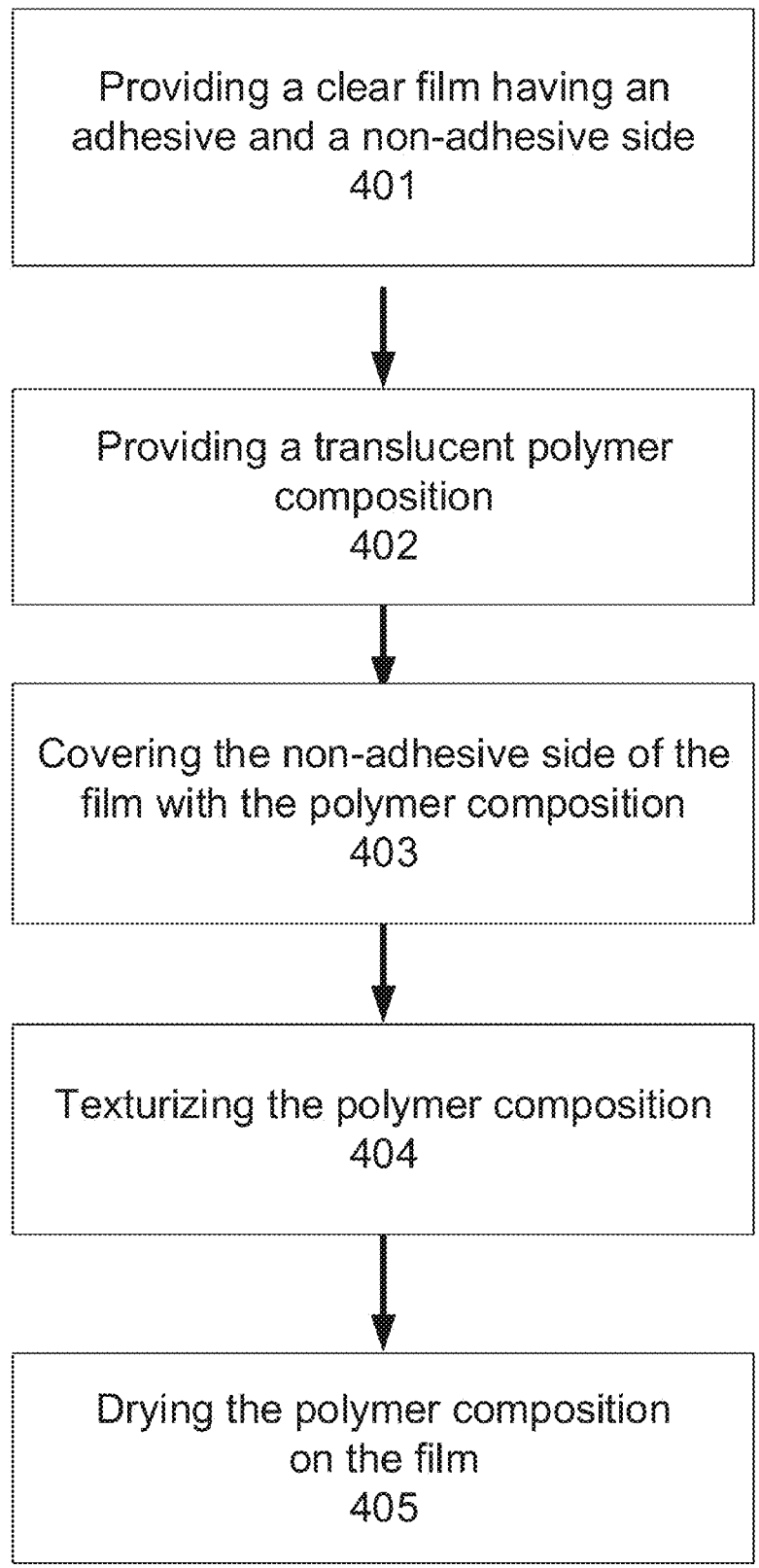

IMAGE TO PAINTING

CROSS-REFERENCE TO RELATED APPLICATIONS

This non-provisional patent application claims priority to U.S. Provisional Patent Application No. 61/742,471, filed on Aug. 13, 2012, entitled "IMAGE TO PAINTING."

FIELD OF THE INVENTION

The present technology relates generally to an apparatus and methods for displaying pictures, and more specifically, but not by way of limitation, to a textured overlay that allows pictures to appear as though they are oil paintings.

BACKGROUND OF THE INVENTION

There is presently an interest in making pictures, including photographs, appear as if they were painted with oil paint on canvas. The prior art allows for printing a computer image onto canvas.

SUMMARY OF THE INVENTION

According to some embodiments, the present technology provides for a textured overlay that allows an image to appear as an oil painting. The overlay includes, a transparent film having a non-adhesive surface, and an adhesive surface, and a texturized translucent polymer composition, wherein the polymer composition contacts the non-adhesive surface of the film.

According to other embodiments, the present technology provides for a kit that allows an image to appear as an oil painting. The kit includes, a picture frame, a back panel; and, a textured overlay, wherein the textured overlay comprises a transparent film having a non-adhesive surface, and an adhesive surface; and a texturized translucent polymer composition, wherein, the polymer composition contacts the non-adhesive surface of the film.

According to additional embodiments, the present technology also provides a process for manufacturing a picture overlay that allows a picture to appear as though it were an oil painting. The process includes, a step of providing a transparent film having an adhesive and a non-adhesive surface, a step of providing a translucent polymer composition, a step of contacting the non-adhesive surface of the film with the polymer composition to form a polymer surface; a step of texturizing the polymer surface, and preferably, a step of drying the polymer composition.

According to additional embodiments, the present technology also provides a textured picture assembly that includes a transparent film having a non-adhesive surface, and an adhesive surface; a texturized translucent polymer composition; and, a picture, wherein the non-adhesive surface of the film contacts the polymer composition, and the picture is adhered to the adhesive surface of the transparent film.

BRIEF DESCRIPTION OF THE DRAWINGS

FIG. 1A is a cross-sectional side view of the preferred embodiment of the overlay.
FIG. 1B is a cross-sectional side view of the preferred embodiment of the kit comprising the overlay.
FIG. 2A is a cross-sectional view of the overlay kit with a picture between the overlay and a backboard.
FIG. 2B is an exploded view of the overlay kit and the picture.
FIG. 3 is a preferred embodiment of the picture used for displaying pictures.
FIG. 4 is a flow chart of a process for making the picture overlay.

DETAILED DESCRIPTION OF EXEMPLARY EMBODIMENTS

While this technology is susceptible of embodiments in many different forms, there is shown in the drawings and will herein be described in detail several specific embodiments with the understanding that the present disclosure are to be considered as an exemplification of the principles of the technology and is not intended to limit the technology to the embodiments illustrated.

As used herein, an overlay preferably refers to a film that covers the face of a picture. The picture may be a photograph. Alternatively, the picture may be a drawing. Those of skill in the art will appreciate that the picture may refer to other images, including those produced by a computer Textured or texturized preferably refers to ridges or lines on the face of the polymer composition, made with a brush or equivalent technology. While not being bound by theory, it is believed that the textured overlay allows for the refraction of light, and the refracted light allows the picture to be perceived as an oil painting.

The translucent polymer composition referred to herein, may be a commercially available composition. Preferably, the translucent compositions may be caulking compositions or the equivalent. Such compositions are well known in the prior art and are described for example in U.S. Pat. Nos. 7,994,261; 7,446,146, 6,054,549 6,114,366; 5,622,708; 5,514,827; 5,371,162; 5,120,785; 5,034,455; 5,525,262; 5,429,772; 4,814,368; 4,806,590; 4,623,677; 4,381,066; 4,277,387; 4,292,220; 4,092,192; 4,020,218; 4,000,347; 4,202,804; 3,919,146, and 3,786,020, 3,804,798; 3,597,377; 3,951,898; and 2,888,364 all of which are incorporated herein by reference. Commercially available translucent caulking materials suitable for the invention are LEXEL CLEAR, Phenoseal Translucent Adhesive Caulk, Lifetime Pro Clear Siliconized Acrylic Adhesive Sealant, and GE Silicone II Clear Kitchen and Bath Caulk.

The polymer composition may include a polymer selected from the group consisting of an acrylic polymer and a silicone polymer. Preferably, the composition includes an acrylic polymer.

The transparent film referred to herein, may be may be a polyester film, a vinyl film, a polycarbonate film, mixtures thereof or an equivalent. Preferably, the film is vinyl. Commercially available clear film suitable for the invention are Clear Contact Paper, Duck Laminate Adhesive Peel N' Stick Shelf Liner Clear, Con-Tact Brand Self Adhesive Shelf Liner Clear Scotch Self sealing laminating Sheets.

Mylar is one commercially available transparent film that may be used with this technology. Mylar is often used to generically refer to polyester film or plastic sheet. However, Mylar is a registered trademark owned by Dupont Tejjin Films for a specific family of plastic sheet products made from the resin (PET) Polyethylene Terephthalate. The true generic term for this material is Polyester Film.

According to some embodiments, the present technology provides for a textured overlay that allows a picture to appear as an oil painting. The textured overlay includes, a transparent film having a non-adhesive surface, and an adhesive surface, and a texturized translucent polymer composition, wherein, the polymer composition contacts the non-adhesive surface of the film.

Preferably, the overlay further includes a release paper, which contacts the adhesive surface.

According to other embodiments, the present technology provides for a method of making a picture appear as though it were an oil painting that includes a step of adhering a picture to the adhesive surface of the textured film overlay.

According to some embodiments, the present technology may be a kit, which allows a picture to appear as an oil painting. The kit preferably includes a picture frame, a back panel; and, a textured overlay, wherein the textured overlay comprises a transparent film having a non-adhesive surface, and an adhesive surface; and a texturized translucent polymer composition, and wherein, the polymer composition contacts the non-adhesive surface of the film.

Optionally, the kit comprises a release paper, which contacts the adhesive surface. Preferably, the picture frame has approximately the same inner perimeter as the outer perimeter of the picture.

According to additional embodiments, the present technology also provides a process for manufacturing a picture overlay. The process includes, a step of providing a transparent film having an adhesive and a non-adhesive surface, a step of providing a translucent polymer composition, a step of contacting the non-adhesive surface of the film with the polymer composition to form a polymer surface; a step of texturizing the polymer surface, and preferably, a step of drying the polymer composition.

Preferably, the contacting step comprises covering the non-adhesive surface of the film with the polymer composition.

Optionally, the texturizing step comprises brushing the surface of the composition with strokes of a brush.

According to additional embodiments, the present technology also provides a textured picture assembly that includes a transparent film having a non-adhesive surface, and an adhesive surface; a texturized translucent polymer composition; and, a picture, wherein the non-adhesive surface of the film contacts the polymer composition, and the picture is adhered to the adhesive surface of the transparent film.

FIG. 1A shows a cross-sectional side view of a preferred embodiment of the picture overlay. The overlay includes a clear film 101, having a non-adhesive surface 101a, and an adhesive surface 101b. Translucent polymer 102, contacts the non-adhesive surface of the film 101a. Release paper 103 contacts the adhesive surface. FIG. 1A shows the release paper may be removed from the adhesive surface 101b by a pealing motion 103c.

FIG. 1B is a cross-sectional view of a preferred kit for displaying pictures, wherein the kit incorporates the picture overlay. The picture overlay includes the clear film 101, the translucent polymer 102, and the release paper 103 as shown in FIG. 1A. A preferred embodiment of the kit also includes a back panel 104 and a picture frame 105. Optionally the back panel may be made from a cardboard, a wood or paper composite material. The frame may be made from wood or a wood composite material.

FIG. 2A is a cross-sectional view of a textured picture assembly. The release paper 103 has been removed from the adhesive surface 101b of the film 101. Picture 106, sandwiched between the film 101 and the back panel 104, is adhered to the adhesive surface 101b of the film.

FIG. 2b is an exploded view, of the assembly showing the line of sight of sight A. The line of sight A passes through the picture frame 105, the translucent polymer 102, and the film 101, before reaching the picture 106. As shown, the interior width w and height h of the picture frame is approximately the same as the exterior width w and height h of the picture, so that the entire picture is, to an approximation, fully visible when viewed through the frame.

FIG. 3 shows the use of the kit with the picture to make the picture assembly. 301 illustrates a picture frame 105 with a back panel 104 and the overlay 102, 101, including the release paper 103. As shown in 302, the overlay may be anchored to the back panel with an enlarged overlap or lip having an adhesive along the top edge. Preferably, the overlap is hidden from view when the kit is fully assembled. 303 illustrates that a picture 106 is inserted between the overlay 102, 101 103, and the flat surface of the back panel 104. As illustrated in 304, a small portion of release paper is peeled from the textured overlay, to expose the adhesive surface of the clear film 101b. One edge of the adhesive surface 101b is aligned with a picture 106 and pressed onto the image. 305 shows that the balance of the release paper is removed and the textured overlay is pressed onto the remainder of the image. Care is taken so that there are no air bubbles caught between the picture and the clear film. 306 shows the picture frame 105 attached to the front surface of the assembly.

The present technology also provides a process for manufacturing the picture overlay. This is shown in the flow chart of FIG. 4. The first step 401 is to provide a clear film 101 having an adhesive surface 101b and a non-adhesive surface 101a.

Step 402 is to provide a translucent polymer. The translucent polymer composition may be a caulking composition, as described above, or equivalent compositions, whether commercially available or not.

A contacting step 403 involves contacting the non-adhesive side of the film with the polymer composition. In one embodiment the polymer composition may be shaped into a thin square on the non-adhesive surface of the film using a spackling trowel.

Step 404 requires texturizing the polymer, optionally with a brush. The texturizing step preferably comprises brushing the surface of the composition with strokes of an artist's brush. The brush strokes are preferably random short, long, swirl and semi-swirl motions. Those of skill in the art will recognize that a variety of equivalent techniques will be suitable for this step.

Following the texturizing step the translucent polymer composition is preferably allowed to dry, as shown in step 405.

Those of skill in the art will understand that the invention provides that the frame, back panel, and the texturized film may be produced in a variety of sizes.

The above description is illustrative and not restrictive. Many variations of the technology will become apparent to those of skill in the art upon review of this disclosure. The scope of the technology should, therefore, be determined not with reference to the above description, but instead should be determined with reference to the appended claims along with their full scope of equivalents.

EXAMPLES

Example 1

A clear self-adhesive contact paper is cut to form a rectangle of approximately 8×10 inches. One ounce of a translucent caulking composition is placed directly onto the non-adhesive surface of the contact paper. A 1½ inch spackling trowel is used to smooth the composition into a 6×6 inch square, which is 1/16th inch thick. A size 12 flat bright head artist brush is used to spread the composition on the contact paper as well as to texturize the composition. The brush strokes are preferably made in short, long, swirl and semi-swirl motions. This is continued until the non-adhesive surface of the contact paper is completely covered with the composition. The composition is allowed to dry for 24 hours, to complete formation of the textured overlay.

Example 2

An 8×10 inch photograph is placed on a flat surface, of the back panel face up, and underneath the texturized overlay. Two inches of release paper is peeled from the overlay, to expose the adhesive surface. One edge of the adhesive surface is aligned with a photographic image and pressed onto the image. The balance of the release paper is removed and the textured overlay is pressed onto the remainder of the image. The frame has an outside diameter of 10×12 inches and an inside diameter of 8×10 inches, so that the picture is fully visible when viewed through the frame.

Example 3

An antiquated effect is achieved by mixing burnt umber, or a similar brown color, acrylic paint with translucent/clear caulk in varying ratios from about 1:10 to about 1:30. Translucent caulk is applied to the film first and burnt umber mixture is overlaid randomly.

Example 4

An Impressionist effect is achieved with the same methodology described in Example 3, but substituting white acrylic paint for the burnt umber.

The invention claimed is:

1. A kit that allows a picture to appear as an oil painting, consisting of:
   a. a picture frame;
   b. a back panel; and,
   c. a textured overlay, wherein the textured overlay comprises a transparent film having a non-adhesive surface, and an adhesive surface; and a texturized translucent polymer composition, and wherein, the non-adhesive surface of the film contacts the polymer composition, and a release paper that contacts the adhesive surface.

2. The kit of claim 1, wherein the picture is selected from the group consisting of a photograph, a drawing and a computer printout.

3. The kit overlay of claim 1, wherein the picture is a photograph.

4. The overlay of claim 1, wherein the transparent film is selected from the group consisting of a polyester film, a vinyl film, a polycarbonate film and mixtures thereof.

5. The overlay of claim 1, wherein the film is a vinyl film.

6. The kit of claim 1, wherein the polymer composition comprises a polymer selected from the group consisting of an acrylic and a silicone polymer.

7. The kit of claim 1, wherein the polymer is an acrylic polymer.

8. The kit of claim 1, wherein picture frame has approximately the same inner perimeter as the outer perimeter of the picture.

9. A textured overlay picture assembly consisting of:
   a. a transparent film having a non-adhesive surface, and an adhesive surface;
   b. a texturized translucent polymer composition; and,
   c. a picture
   wherein, the non-adhesive surface of the film contacts the polymer composition, and the picture is adhered to the adhesive surface of the film.

* * * * *